US011858868B2

(12) United States Patent
Sun et al.

(10) Patent No.: US 11,858,868 B2
(45) Date of Patent: Jan. 2, 2024

(54) ANTI-CORROSION AND ANTI-COKING CERAMIC COATING WITH EASY STATE IDENTIFICATION FOR COAL-FIRED BOILER AND PREPARATION METHOD THEREOF

(71) Applicant: Xuzhen New Energy Technology (Shanghai) Co., Ltd., Shanghai (CN)

(72) Inventors: Hongfei Sun, Shanghai (CN); Jing Zhu, Shanghai (CN); Xiaotao Luo, Shanghai (CN); Hefa Li, Shanghai (CN); Xianwei Zhu, Shanghai (CN)

(73) Assignee: Xuzhen New Energy Technology Co Ltd, Shanghai (CN)

( * ) Notice: Subject to any disclaimer, the term of this patent is extended or adjusted under 35 U.S.C. 154(b) by 0 days.

(21) Appl. No.: 17/743,394

(22) Filed: May 12, 2022

(65) Prior Publication Data
US 2023/0060480 A1    Mar. 2, 2023

(30) Foreign Application Priority Data

Aug. 24, 2021   (CN) .......................... 202110975797.7

(51) Int. Cl.
*C04B 41/89*    (2006.01)
*C04B 35/18*    (2006.01)
(Continued)

(52) U.S. Cl.
CPC .............. *C04B 41/89* (2013.01); *C04B 35/18* (2013.01); *C04B 35/80* (2013.01); *C04B 41/87* (2013.01);
(Continued)

(58) Field of Classification Search
CPC ......... C04B 41/89; C04B 35/18; C04B 35/80; C04B 41/87; C04B 2235/5276;
(Continued)

(56) References Cited

FOREIGN PATENT DOCUMENTS

CN    109096907 A    12/2018
CN    111018505 A  *  4/2020

OTHER PUBLICATIONS

CN-111018505-A machine translation (Year: 2020).*

* cited by examiner

*Primary Examiner* — Karl E Group
*Assistant Examiner* — Cameron K Miller
(74) *Attorney, Agent, or Firm* — Elizabeth Yang (57) ABSTRACT

Disclosed are an anti-corrosion and anti-coking ceramic coating with easy state identification for a coal-fired boiler and a preparation method thereof. The ceramic coating is formed by compounding a bottom coating layer and a surface coating layer, wherein the bottom coating layer is prepared from raw materials comprising sodium silicate, lanthanum oxide, niobium pentoxide, aluminum oxide, bismuth oxide, boron oxide, zinc oxide, silicon oxide, titanium dioxide, nano whisker, titanium nitride, and graphite fluoride, and the surface coating layer is prepared from raw materials comprising sodium silicate, lanthanum oxide, niobium pentoxide, chromium oxide, aluminum oxide, bismuth oxide, boron oxide, zinc oxide, silicon oxide, graphite fluoride, titanium nitride, silicon carbide, nano whisker, and cobalt green. An operating state of the ceramic coating is rapidly identified by a color difference between the bottom coating layer and the surface coating layer, which is beneficial to efficient maintenance of the ceramic coating during inspection.

3 Claims, 4 Drawing Sheets
(3 of 4 Drawing Sheet(s) Filed in Color)

(51) Int. Cl.
 *C04B 35/80* (2006.01)
 *C04B 41/87* (2006.01)
(52) U.S. Cl.
 CPC ............... *C04B 2235/5276* (2013.01); *C04B 2235/9607* (2013.01); *C04B 2235/9684* (2013.01)
(58) Field of Classification Search
 CPC .... C04B 2235/9684; C04B 2235/3251; C04B 2235/425; C04B 2235/5236; C04B 2235/5244; C09D 7/70
 See application file for complete search history.

ANTI-CORROSION AND ANTI-COKING CERAMIC COATING WITH EASY STATE IDENTIFICATION FOR COAL-FIRED BOILER AND PREPARATION METHOD THEREOF

CROSS REFERENCE TO RELATED APPLICATION

This patent application claims the benefit and priority of Chinese Patent Application No. 202110975797.7, entitled with "Anti-corrosion and anti-coking ceramic coating with easy state identification for coal-fired boiler", filed on Aug. 24, 2021, the disclosure of which is incorporated by reference herein in its entirety as part of the present application.

TECHNICAL FIELD

The present disclosure relates to the technical field of ceramic coatings, in particular to an anti-corrosion and anti-coking ceramic coating with easy state identification for a coal-fired boiler and a preparation method thereof.

BACKGROUND ART

The popularity of low-nitrogen combustion makes a heating surface of coal-fired boilers more prone to severe high-temperature corrosion, coking and slagging. In addition, under the pressure of rising coal price, power stations have to use a large amount of non-designed coals for a blending combustion, thereby further aggravating the corrosion and coking of boilers.

As for the anti-corrosion effect of metal coatings used for heating surfaces of traditional boilers such as Ni—Cr—Ti, it is difficult to cope with the current operating environment of boilers for a long time, and the coking and slagging still occur.

Preparing a special ceramic coating on a heating surface of a coal-fired boiler provides a feasible way for simultaneously solving the high-temperature corrosion, coking and slagging on the heating surface. However, due to large physical differences between ceramic materials and metals of the heating surface of the substrate as well as large brittleness of the ceramic materials, the coating is prone to cracking and falling off during use, adversely affecting effects of the coating.

In addition, due to the complex and harsh internal environment of the boilers, it is difficult to inspect the operation status of the coating, leading to excessive maintenance or insufficient maintenance during the coating maintenance by power stations. Therefore, coatings with easy state identification are more valuable.

SUMMARY

To solve the above problems, the present disclosure provides an anti-corrosion and anti-coking ceramic coating with easy state identification for a coal-fired boiler and a preparation method thereof.

To achieve the above object, the present disclosure provides the following technical solutions:

Provided is an anti-corrosion and anti-coking ceramic coating with easy state identification for a coal-fired boiler, which is formed by compounding a bottom coating layer and a surface coating layer, characterized in that:

the bottom coating layer is prepared from raw materials comprising, in parts by weight, 20-30 parts of sodium silicate, 1-4 parts of lanthanum oxide, 1-4 parts of niobium pentoxide, 10-20 parts of aluminum oxide, 7-12 parts of bismuth oxide, 1-3 parts of boron oxide, 1-3 parts of zinc oxide, 1-3 parts of silicon oxide, 5-10 parts of titanium dioxide, 2-6 parts of nano whisker, 1-5 parts of titanium nitride, and 10-15 parts of graphite fluoride; and the surface coating layer is prepared from raw materials comprising, in parts by weight, 20-30 parts of sodium silicate, 1-4 parts of lanthanum oxide, 1-4 parts of niobium pentoxide, 5-10 parts of chromium oxide, 5-10 parts of aluminum oxide, 7-12 parts of bismuth oxide, 1-3 parts of boron oxide, 1-3 parts of zinc oxide, 1-3 parts of silicon oxide, 10-15 parts of graphite fluoride, 1-5 parts of titanium nitride, 5-10 parts of silicon carbide, 2-6 parts of nano whisker, and 2-6 parts of cobalt green.

In some embodiments of the present disclosure, the nano whisker is one selected from the group consisting of nano silicon carbide whisker and nano zirconia whisker.

The present disclosure further provides a method for preparing the anti-corrosion and anti-coking ceramic coating with easy state identification for a coal-fired boiler, including:

step 1, weighing the raw materials comprising, in parts by weight, 20-30 parts of the sodium silicate, 1-4 parts of the lanthanum oxide, 1-4 parts of the niobium pentoxide, 10-20 parts of the aluminum oxide, 7-12 parts of the bismuth oxide, 1-3 parts of the boron oxide, 1-3 parts of the zinc oxide, 1-3 parts of the silicon oxide, 5-10 parts of the titanium dioxide, 2-6 parts of the nano whisker, 1-5 parts of the titanium nitride, and 10-15 parts of the graphite fluoride;

step 2, adding deionized water that is 1.5-2 times the loose packing volume of the raw materials of step 1 to the sodium silicate, and stirring to be uniform, to obtain a mixture I for use;

step 3, mixing and ball milling the lanthanum oxide, the niobium pentoxide, the aluminum oxide, the bismuth oxide, the boron oxide, the zinc oxide, the silicon oxide, the titanium dioxide, and the titanium nitride in a high-energy ball mill for 4-6 h, to obtain a powder mixture II;

step 4, stirring the graphite fluoride, the nano whisker, and the powder mixture II obtained in step 3 in a mixer for 0.5-1 h, to obtain a mixture III;

step 5, adding the mixture I obtained in step 2 to the mixture III obtained in step 4, and stirring in a mixer for 0.5-1 h, to obtain a bottom coating for use;

step 6, weighing raw materials comprising, in parts by weight, 20-30 parts of the sodium silicate, 1-4 parts of the lanthanum oxide, 1-4 parts of the niobium pentoxide, 5-10 parts of the chromium oxide, 5-10 parts of the aluminum oxide, 7-12 parts of the bismuth oxide, 1-3 parts of the boron oxide, 1-3 parts of the zinc oxide, 1-3 parts of the silicon oxide, 10-15 parts of the graphite fluoride, 1-5 parts of the titanium nitride, 5-10 parts of the silicon carbide, 2-6 parts of the nano whisker, and 2-6 parts of the cobalt green;

step 7, adding deionized water that is 1.5-2 times the loose packing volume of the raw materials of step 6 to the sodium silicate, and stirring to be uniform, to obtain a mixture IV for use;

step 8, mixing and ball milling the lanthanum oxide, the niobium pentoxide, the chromium oxide, the aluminum oxide, the bismuth oxide, the boron oxide, the zinc oxide, the silicon oxide, the titanium nitride, the silicon carbide, and the cobalt green in a high-energy ball mill for 4-6 h, to obtain a powder mixture V;

step 9, stirring the graphite fluoride, the nano whisker, and the powder mixture V obtained in step 8 in a mixer for 0.5-1 h, to obtain a mixture VI;

step 10, adding the mixture IV obtained in step 7 to the mixture VI obtained in step 9, and stirring in a mixer for 0.5-1 h, to obtain a surface coating for use;

step 11, pretreating a surface of a substrate by using a sandblasting technology until a cleanliness of Sa3.0 level and a roughness of 25-75 μm are reached; and step 12, spraying the bottom coating onto the surface of the substrate, and drying the bottom coating, to obtain a bottom coating layer; spraying the surface coating onto the bottom coating layer, and drying the surface coating, to obtain a surface coating layer; sintering the bottom coating layer and the surface coating layer at 400° C. for 30 min, to obtain the anti-corrosion and anti-coking ceramic coating with easy state identification.

In the present disclosure, the powder of raw materials is refined by a high-energy ball mill, such that a micro-nano-scale rough structure with low surface energy is formed on the surface of the prepared ceramic coating. In the present disclosure, due to low wettability of the graphite fluoride and the titanium nitride and the micro-nano-scale rough structure on the surface of the ceramic coating, the adhesion of coke slag to the surface of the ceramic coating is reduced. In addition, a self-lubricating property of the graphite fluoride further promotes exfoliation of the coke slag on the surface of coating layer. Therefore, the excellent anti-coking and anti-slagging properties are imparted to the ceramic coating. In the present disclosure, the addition of nano whisker could improve toughness of the ceramic coating, thereby improving reliability of the ceramic coating during operation. In the present disclosure, an operating state of the ceramic coating is rapidly identified by a color difference between the bottom coating layer and the surface coating layer, which is beneficial to efficient maintenance of the ceramic coating during inspection. Due to the addition of aluminum oxide, bismuth oxide, boron oxide, zinc oxide, and silicon oxide, a low-temperature sintering could be achieved and the relative density of the ceramic coating could be improved.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A-3B shows an operating state of a water wall in combustion region of a boiler of a power station in Hami, China before renovation by using the anti-corrosion and anti-coking ceramic coating according to the present disclosure, in which FIG. 3A shows the coking situation, and FIG. 3B shows the surface corrosion after coke cleaning.

DETAILED DESCRIPTION OF THE EMBODIMENTS

In order to make the object and advantages of the present disclosure clearer and more comprehensible, the present disclosure will be further described in detail below with reference to the examples. It should be appreciated that the specific example described herein is only intended to explain the present disclosure and is not intended to limit the present disclosure.

The present disclosure provides an anti-corrosion and anti-coking ceramic coating with easy state identification for a coal-fired boiler, which is formed by compounding a bottom coating layer and a surface coating layer, wherein the bottom coating layer is prepared from raw materials comprising, in parts by weight, 20-30 parts of sodium silicate, 1-4 parts of lanthanum oxide, 1-4 parts of niobium pentoxide, 10-20 parts of aluminum oxide, 7-12 parts of bismuth oxide, 1-3 parts of boron oxide, 1-3 parts of zinc oxide, 1-3 parts of silicon oxide, 5-10 parts of titanium dioxide, 2-6 parts of nano whisker, 1-5 parts of titanium nitride, and 10-15 parts of graphite fluoride; and the surface coating layer is prepared from raw materials comprising, in parts by weight, 20-30 parts of sodium silicate, 1-4 parts of lanthanum oxide, 1-4 parts of niobium pentoxide, 5-10 parts of chromium oxide, 5-10 parts of aluminum oxide, 7-12 parts of bismuth oxide, 1-3 parts of boron oxide, 1-3 parts of zinc oxide, 1-3 parts of silicon oxide, 10-15 parts of graphite fluoride, 1-5 parts of titanium nitride, 5-10 parts of silicon carbide, 2-6 parts of nano whisker, and 2-6 parts of cobalt green.

In some embodiments, the bottom coating layer is prepared from the following raw materials: in parts by weight, 25 parts of the sodium silicate, 2 parts of the lanthanum oxide, 2 parts of the niobium pentoxide, 15 parts of the aluminum oxide, 9 parts of the bismuth oxide, 2 parts of the boron oxide, 2 parts of the zinc oxide, 2 parts of the silicon oxide, 7 parts of the titanium dioxide, 4 parts of the nano whisker, 3 parts of the titanium nitride, and 12 parts of the graphite fluoride; the surface coating layer is prepared from the following raw materials: in parts by weight, 25 parts of the sodium silicate, 2 parts of the lanthanum oxide, 2 parts of the niobium pentoxide, 7 parts of the chromium oxide, 7 parts of the aluminum oxide, 9 parts of the bismuth oxide, 2 parts of the boron oxide, 2 parts of the zinc oxide, 2 parts of the silicon oxide, 12 parts of the graphite fluoride, 3 parts of the titanium nitride, 7 parts of the silicon carbide, 4 parts of the nano whisker, and 4 parts of the cobalt green.

In some embodiments, in the anti-corrosion and anti-coking ceramic coating, the nano whisker is any one selected from the group consisting of nano silicon carbide whisker and nano zirconia whisker.

In some embodiments, in the raw materials for the bottom coating layer, the lanthanum oxide, the niobium pentoxide, the aluminum oxide, the bismuth oxide, the boron oxide, the zinc oxide, the silicon oxide, the titanium dioxide, and the titanium nitride are in the form of powder with a particle size of 1-10 μm, respectively; the graphite fluoride has a thickness of 1-10 μm and a particle size of 1-30 μm; the nano whisker has a length of 10-60 μm.

In the bottom coating layer, the sodium silicate is used as an adhesive. Due to the addition of aluminum oxide, bismuth oxide, boron oxide, zinc oxide, and silicon oxide, a low-temperature sintering could be achieved and the relative density of the ceramic coating could be improved, thereby ensuring the isolation of the substrate from the external corrosive medium. In addition, due to the addition of aluminum oxide, the high-temperature corrosion resistance of the ceramic coating is further improved. Due to the addition of lanthanum oxide and niobium pentoxide, the sintering temperature range is broadened and the sintering quality is improved. Due the addition of nano whisker, the toughness of the ceramic coating is enhanced, thereby improving the bonding with the substrate metal and the mechanical properties of the ceramic coating. Due to the addition of the titanium nitride and graphite fluoride, the wettability between the ceramic coating and the molten slag is reduced, thereby imparting the anti-coking and anti-slagging performance to the ceramic coating. Also, the self-lubricity of graphite fluoride and the micro-nano-scale rough structure with low surface energy of the ceramic coating further help to improve the anti-coking and anti-slagging performance of the ceramic coating. The presence of titanium dioxide makes the ceramic coating with a white appearance.

In some embodiments, in the raw materials for the surface coating layer, the lanthanum oxide, the niobium pentoxide, the chromium oxide, the aluminum oxide, the bismuth oxide, the boron oxide, the zinc oxide, the silicon oxide, the titanium nitride, the silicon carbide, and the cobalt green are in the form of powders with a particle size of 1-10 μm, respectively; the graphite fluoride has a thickness of 1-10 μm and a particle size of 1-30 μm; the nano whisker has a length of 10-60 μm.

In the surface coating layer, the sodium silicate is used as an adhesive. Due to the addition of aluminum oxide, bismuth oxide, boron oxide, zinc oxide, and silicon oxide, a low-temperature sintering could be achieved and the relative density of the ceramic coating could be improved, thereby ensuring the isolation of the substrate from the external corrosive medium. In addition, due to the addition of aluminum oxide, the high-temperature corrosion resistance of the ceramic coating is improved. Due to the addition of chromium oxide, the high-temperature corrosion resistance of the ceramic coating is further improved. Due to the addition of lanthanum oxide and niobium pentoxide, a sintering temperature range is broadened, and the sintering quality is improved. Due to the addition of nano whisker, the toughness of the ceramic coating is enhanced. Due to the addition of the titanium nitride and graphite fluoride, the wettability between the ceramic coating and the molten slag is reduced, thereby imparting anti-coking and anti-slagging performance to the ceramic coating. Also, the self-lubricity of graphite fluoride and the micro-nano-scale rough structure with low surface energy of the ceramic coating further help to improve the anti-coking and anti-slagging performance of the ceramic coating. Due to the addition of the silicon carbide, the wear resistance of the ceramic coating is improved. The addition of the cobalt green makes the ceramic coating with a green appearance. Due to the addition of the chromium oxide, the color stability of the ceramic coating during operation is further ensured.

EXAMPLE 1

Step 1, deionized water that was 1.75 times the loose packing volume of all raw materials for a bottom coating layer was provided.

Step 2, the deionized water was added to 25 g of sodium silicate, and they were stirred to be uniform, obtaining a mixture I.

Step 3, 2 g of lanthanum oxide, 2 g of niobium pentoxide, 15 g of aluminum oxide, 9 g of bismuth oxide, 2 g of boron oxide, 2 g of zinc oxide, 2 g of silicon oxide, 7 g of titanium dioxide, and 3 g of titanium nitride, each of which had a particle size of 1-10 μm respectively, were mixed and ball milled in a high-energy ball mill for 4-6 h, obtaining a further refined powder mixture II.

Step 4, 12 g of graphite fluoride with a thickness of 1-10 μm and a particle size of 1-30 μm, and 4 g of nano silicon carbide whisker with a length of 10-60 μm were added to the powder mixture II obtained in step 3, and they were stirred in a mixer for 0.5-1 h at a stirring rate of 50-150 rpm, obtaining a mixture III.

Step 5, the mixture I obtained in step 2 was added to the mixture III obtained in step 4, and they were stirred in a mixer for 0.5-1 h at a stirring rate of 50-150 rpm, obtaining a bottom coating.

Step 6, deionized water that was 1.75 times the loose packing volume of all raw materials for a surface coating layer was provided.

Step 7, the deionized water was added to 25 g of the sodium silicate, and they were stirred to be uniform, obtaining a mixture IV.

Step 8, 2 g of lanthanum oxide, 2 g of niobium pentoxide, 7 g of chromium oxide, 7 g of aluminum oxide, 9 g of bismuth oxide, 2 g of boron oxide, 2 g of zinc oxide, 2 g of silicon oxide, 3 g of titanium nitride, 7 g of silicon carbide, 4 g of nano silicon carbide whisker, and 4 g of cobalt green, each of which had a particle size of 1-10 μm respectively, were mixed and ball milled in a high-energy ball mill for 4-6 h, obtaining a further refined powder mixture V.

Step 9, 12 g of graphite fluoride with a thickness of 1-10 μm and a particle size of 1-30 μm, and 4 g of nano silicon carbide whisker with a length of 10-60 μm were added to the powder mixture V obtained in step 8, and they were stirred in a mixer for 0.5-1 h at a stirring rate of 50-150 rpm, obtaining a mixture VI.

Step 10, the mixture IV obtained in step 7 was added to the mixture VI obtained in step 9, and they were stirred in a mixer for 0.5-1 h at a stirring rate of 50-150 rpm, obtaining a surface coating.

Step 11, the environment was inspected, and a temperature of 25° C. and a relative humidity of 60% were maintained in the construction environment, and the temperature of a substrate was ensured to be at least 3° C. higher than the dew point temperature.

Step 12, a surface of the substrate was pretreated by using a sandblasting technology until a cleanliness of Sa3.0 level and a roughness of 25-75 μm were reached.

Step 13, the coating was stirred again at 50-150 rpm for 0.5-1 h before spraying. The bottom coating was sprayed onto the surface of the substrate by using an air atomization spray gun, and dried. The thickness of the bottom coating layer was measured, and controlled to be 50-100 μm. When the thickness of the bottom coating layer was qualified, the surface coating was sprayed onto the bottom coating layer, and dried. The overall thickness of the ceramic coating was measured, and controlled to be 200-300 μm. When the overall thickness was qualified, the substrate sample with the two-layer-compounded coating was heated to 400° C.

and maintained at the temperature for 30 min, obtaining the anti-corrosion and anti-coking ceramic coating with easy state identification.

Figure 1:
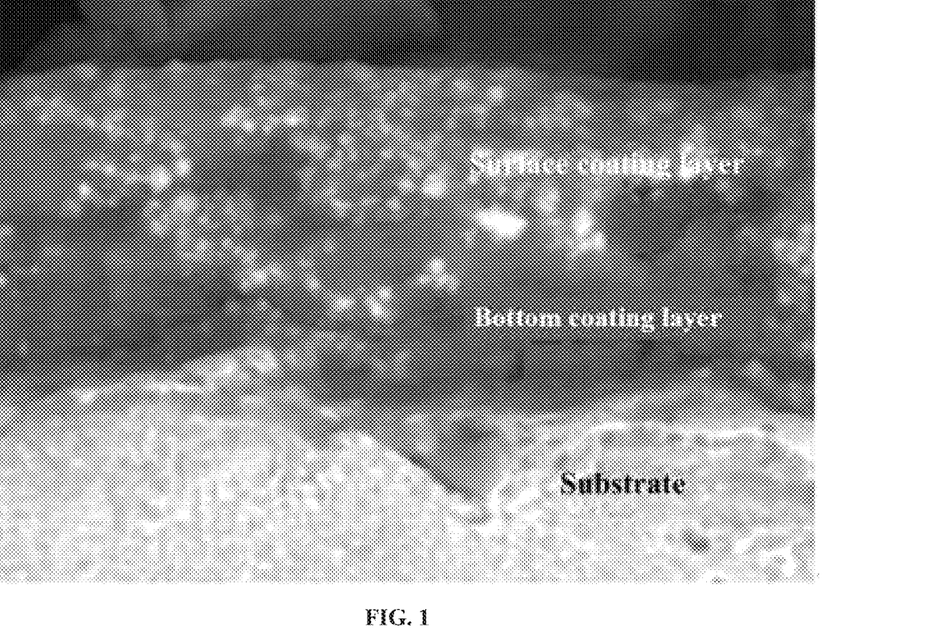
FIG. 1 shows a cross-sectional structure of the anti-corrosion and anti-coking ceramic coating as prepared in Example 1 of the present disclosure, in which the anti-corrosion and anti-coking ceramic coating is dense and tightly combined with a substrate.
Figure 2:
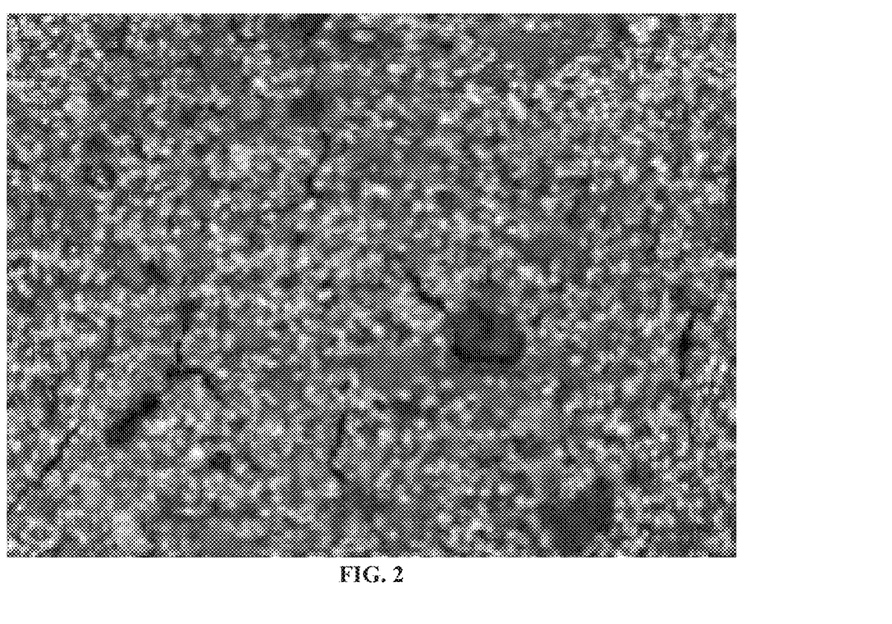
FIG. 2 shows surface morphology of the anti-corrosion and anti-coking ceramic coating as prepared in Example 1 of the present disclosure.
Figure 3A:
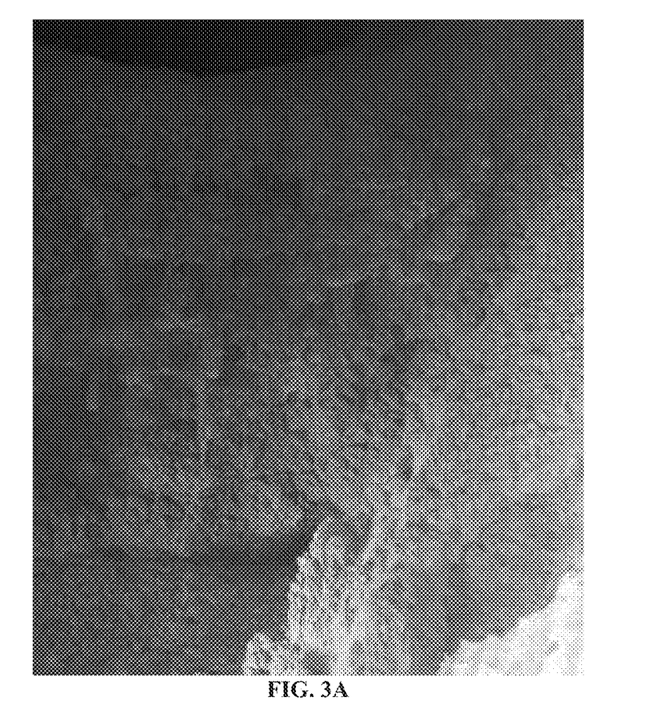
Figure 3B:
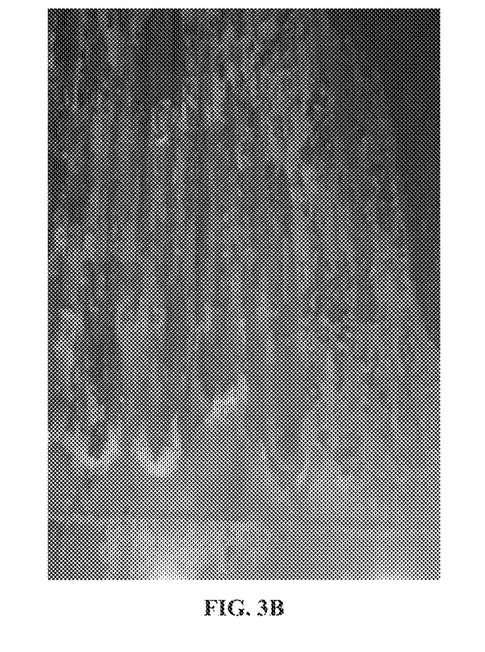
Figure 4:
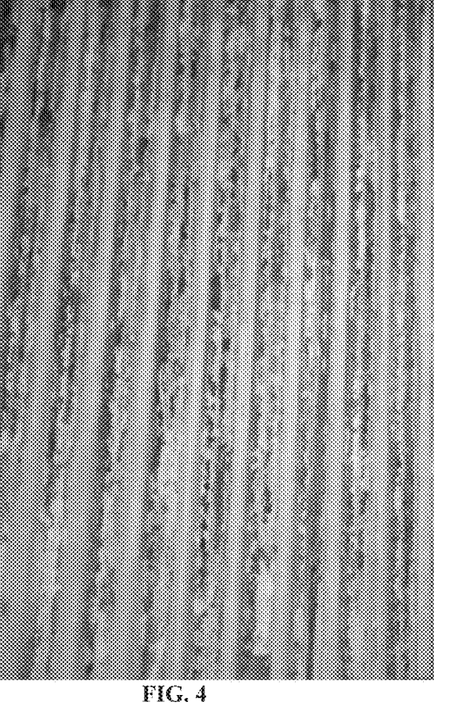
FIG. 4 shows a state of the water wall shown in FIG. 2 after operation of 14,000 h, the water wall being renovated by using the anti-corrosion and anti-coking ceramic coating according to the present disclosure.

The cross-sectional structure of the ceramic coating obtained in Example 1 is shown in FIG. 1. As can be seen from FIG. 1, the bottom coating layer is well combined with the substrate; the bottom coating layer is well combined with the surface coating layer with no obvious gap; the internal structure of the ceramic coating is dense with no visible pores. In the present disclosure, the powder of raw materials is refined by using a high-energy ball mill, such that a micro-nano-scale rough structure with low surface energy is formed on the surface of the prepared ceramic coating, as shown in FIG. 2. Table 1 shows test results of key use parameters such as bonding strength and thermal shock performance of the ceramic coating. The results show that the ceramic coating exhibits a bonding strength of about 38 MPa, and could withstand at least 80-time thermal shock test, indicating that the ceramic coating exhibits excellent reliability in use. FIGS. 3A-3B shows an operating state of a water wall in a combustion region of a boiler of a power station in Hami, China before renovation by using the ceramic coating according to the present disclosure. As shown in FIGS. 3A-3B, the surface of the water wall is seriously coked and there is high-temperature corrosion (FIG. 3A shows the coking situation, and FIG. 3B shows the surface corrosion after coke cleaning). FIG. 4 shows a state of the water wall in this area after operation of 14,000 h, the water wall being renovated by using the ceramic coating according to the present disclosure. As shown in FIG. 4, there is no coking and slagging on the surface of the water wall, and the high-temperature corrosion is completely alleviated.

Figure 5:
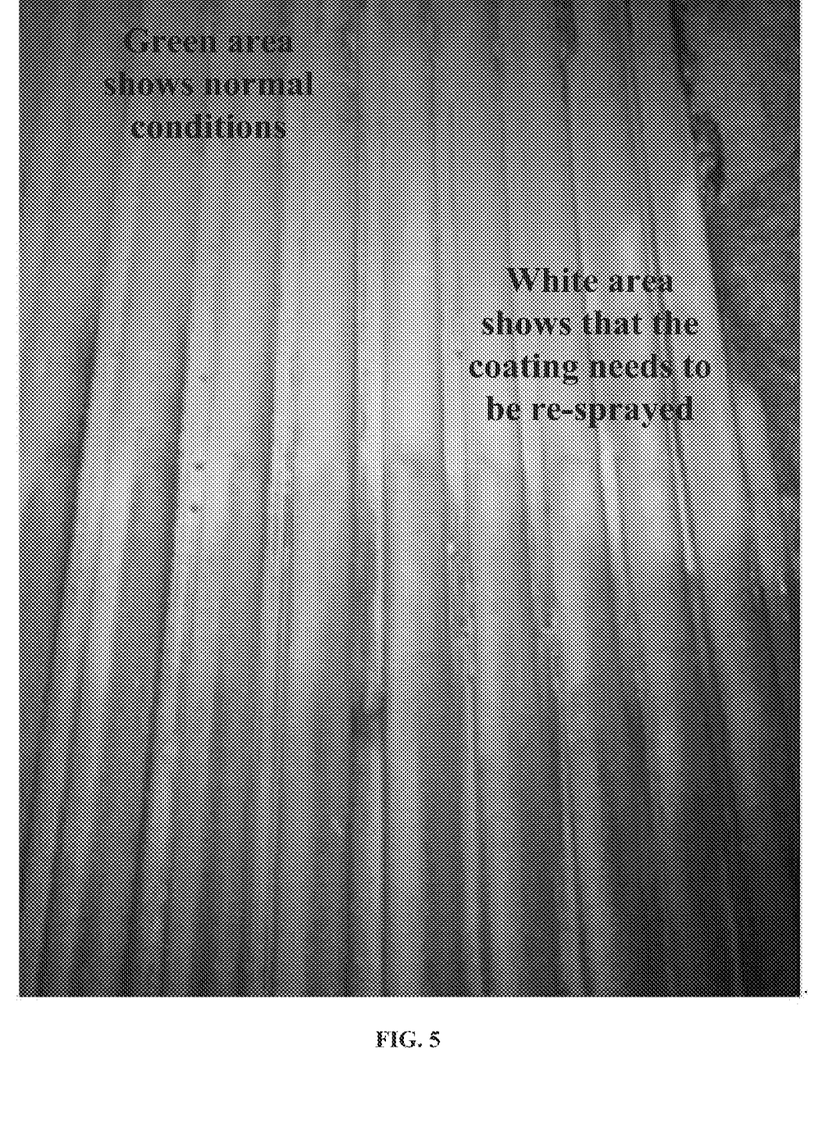
FIG. 5 shows an inspection situation of a water wall of a boiler of a power station in Changji, China after operation of 8,000 h, the water wall being renovated by using the anti-corrosion and anti-coking ceramic coating according to the present disclosure.

FIG. 5 shows an inspection situation of a water wall of a boiler of a power station in Changji, China after operation of 8,000 h, the water wall being renovated by using the ceramic coating according to the present disclosure. As shown in FIG. 5, the current operating state of the ceramic coating can be directly judged by visual inspection (a green area represents that the current surface coating layer is in good condition; a white area represents a loss of the surface coating layer, and a further surface coating needs to be re-sprayed onto the white bottom coating layer).

TABLE 1

Performance test results of ceramic coatings prepared in examples

| Index | Value | Remarks |
| --- | --- | --- |
| Bonding strength | 38 MPa | Testing according to GB/T 5210-2006 |
| Thermal shock performance | 80 times without cracking or falling off | Heating to 1,200° C. and quenching with cold water |

The foregoing description is only preferred implementations of the present disclosure. It should be noted that a person of ordinary skill in the art can also make several improvements and modifications without departing from the principle of the present disclosure. These improvements and modifications should also fall within the scope of the present disclosure.

What is claimed is:

1. A coal-fired boiler with an anti-corrosion and anti-coking ceramic coating with easy state identification, wherein the anti-corrosion and anti-coking ceramic coating is formed by compounding a bottom coating layer and a surface coating layer, characterized in that:

the bottom coating layer is prepared from raw materials comprising, in parts by weight, 20-30 parts of sodium silicate, 1-4 parts of lanthanum oxide, 1-4 parts of niobium pentoxide, 10-20 parts of aluminum oxide, 7-12 parts of bismuth oxide, 1-3 parts of boron oxide, 1-3 parts of zinc oxide, 1-3 parts of silicon oxide, 5-10 parts of titanium dioxide, 2-4 parts of nano whisker, 1-5 parts of titanium nitride, and 10-15 parts of graphite fluoride; and the surface coating layer is prepared from raw materials comprising, in parts by weight, 20-30 parts of sodium silicate, 1-4 parts of lanthanum oxide, 1-4 parts of niobium pentoxide, 5-10 parts of chromium oxide, 5-10 parts of aluminum oxide, 7-12 parts of bismuth oxide, 1-3 parts of boron oxide, 1-3 parts of zinc oxide, 1-3 parts of silicon oxide, 10-15 parts of graphite fluoride, 1-5 parts of titanium nitride, 5-10 parts of silicon carbide, 2-6 parts of nano whisker, and 2-6 parts of cobalt green.

2. The coal-fired boiler with the anti-corrosion and anti-coking ceramic coating with easy state identification as claimed in claim 1, wherein the nano whisker is one selected from the group consisting of nano silicon carbide whisker and nano zirconia whisker.

3. A method for preparing the coal-fired boiler with the anti-corrosion and anti-coking ceramic coating with easy state identification as claimed in claim 1, comprising:

step 1, weighing raw materials comprising in parts by weight, 20-30 parts of the sodium silicate, 1-4 parts of the lanthanum oxide, 1-4 parts of the niobium pentoxide, 10-20 parts of the aluminum oxide, 7-12 parts of the bismuth oxide, 1-3 parts of the boron oxide, 1-3 parts of the zinc oxide, 1-3 parts of the silicon oxide, 5-10 parts of the titanium dioxide, 2-6 parts of the nano whisker, 1-5 parts of the titanium nitride, and 10-15 parts of the graphite fluoride;

step 2, adding deionized water that is 1.5-2 times the loose packing volume of the raw materials of step 1 to the sodium silicate, and stirring to be uniform, to obtain a mixture I for use;

step 3, mixing and ball milling the lanthanum oxide, the niobium pentoxide, the aluminum oxide, the bismuth oxide, the boron oxide, the zinc oxide, the silicon oxide, the titanium dioxide, and the titanium nitride in a high-energy ball mill for 4-6 h, to obtain a powder mixture II;

step 4, stirring the graphite fluoride, the nano whisker, and the powder mixture II obtained in step 3 in a mixer for 0.5-1 h, to obtain a mixture III;

step 5, adding the mixture I obtained in step 2 to the mixture III obtained in step 4, and stirring in a mixer for 0.5-1 h, to obtain a bottom coating for use;

step 6, weighing raw materials comprising, in parts by weight, 20-30 parts of the sodium silicate, 1-4 parts of the lanthanum oxide, 1-4 parts of the niobium pentoxide, 5-10 parts of the chromium oxide, 5-10 parts of the aluminum oxide, 7-12 parts of the bismuth oxide, 1-3 parts of the boron oxide, 1-3 parts of the zinc oxide, 1-3 parts of the silicon oxide, 10-15 parts of the graphite fluoride, 1-5 parts of the titanium nitride, 5-10 parts of the silicon carbide, 2-6 parts of the nano whisker, and 2-6 parts of the cobalt green;

step 7, adding deionized water that is 1.5-2 times the loose packing volume of the raw materials of step 6 to the sodium silicate, and stirring to be uniform to obtain a mixture IV for use;

step 8, mixing and ball milling the lanthanum oxide, the niobium pentoxide, the chromium oxide, the aluminum oxide, the bismuth oxide, the boron oxide, the zinc oxide, the silicon oxide, the titanium nitride, the silicon carbide, and the cobalt green in a high-energy ball mill for 4-6 h, to obtain a powder mixture V;

step 9, stirring the graphite fluoride, the nano whisker and the powder mixture V obtained in step 8 in a mixer for 0.5-1 h, to obtain a mixture VI;

step 10, adding the mixture IV obtained in step 7 to the mixture VI obtained in step 9, and stirring in a mixer for 0.5-1 h, to obtain a surface coating for use;

step 11, pretreating a surface of the coal-fired boiler by using a sandblasting technology until a cleanliness of Sa3.0 level and a roughness of 25-75 μm are reached; and step 12, spraying the bottom coating onto the surface of the coal-fired boiler; drying the bottom coating to obtain the bottom coating layer; spraying the surface coating onto the bottom coating layer, drying the surface coating to obtain the surface coating layer, sintering the bottom coating layer and the surface coating layer at 400° C. for 30 min, to obtain the coal-fired boiler with the anti-corrosion and anti-coking ceramic coating with easy state identification.

* * * * *